United States Patent [19]
Walcerz et al.

[11] Patent Number: 5,374,194
[45] Date of Patent: Dec. 20, 1994

[54] OPEN CHEST CARDIAC MASSAGE SIMULATOR

[75] Inventors: Douglas B. Walcerz, Holden; Michael T. Clohecy, Georgetown, both of Mass.; Jonne H. Helenius, Guilford, Conn.; Sean M. Kavanaugh, Eastham, Mass.; Kevin M. Lord, Westport, Mass.; Jesse W. Spencer, Charlottesville, Va.; Jessica M. Young, Lombard, Ill.

[73] Assignee: Worcester Polytechnic Institute, Worcester, Mass.

[21] Appl. No.: 192,601

[22] Filed: Feb. 7, 1994

[51] Int. Cl.⁵ .............................. G09B 23/28
[52] U.S. Cl. ................................... 434/265
[58] Field of Search ............... 434/265, 262, 268, 272

[56] References Cited

U.S. PATENT DOCUMENTS 2,324,702  7/1943  Hoffmann et al. ............... 434/272
3,027,655  4/1962  Alderson ......................... 434/268
3,568,333  3/1971  Clark ............................... 434/265

FOREIGN PATENT DOCUMENTS 2553214  4/1985  France ............................. 434/265

Primary Examiner—John G. Weiss
Assistant Examiner—Jeffrey A. Smith

[57] ABSTRACT

A Simulator of the cardio-vascular system is provided for use in open chest cardiac massage (OCCM) resuscitation technique instruction. A molded model of a heart is housed in a thoracic mannequin with synthetic skin pulled aside revealing the cardiac muscle as in a clinical situation. A system of valves and tubes modeling blood vessels connects the heart to inlet and outlet reservoirs simulating venous and arterial input and output supported by an adjustable stand. This device provides tactile feedback to the practitioner and permits variations in flow rates and pressures to simulate various cardiac conditions.

2 Claims, 3 Drawing Sheets

OPEN CHEST CARDIAC MASSAGE SIMULATOR

BACKGROUND

Open chest cardiac massage is an important technique in cardiac resuscitation. Although CPR external massage technique is an easier and more convenient method resuscitation, OCCM still has many advantages provided it is performed by medical professionals in a clinical setting.

OCCM facilitates greater cardiac output, 60% of normal compared to only 15–40 achieved by CPR. Also, in some animals with high (compared to humans) pitched rib cages such as canines, CPR must be performed on the animal's side lessening the effect of the compression on the heart. Thus this technique is especially appropriate for use by veterinary doctors. This technique is also practiced routinely by cardiologists who must stop and start the cardiac muscle during the course of an operation. Other types of medical specialists might use this technique during abdominal surgery. During such an operation cardiac arrest can occur accidently due to the presence of metabolites or anesthesia particles in the bloodstream that teach the heart and cause it to stop beating. In such a situation CPR would be quite inappropriate due to the exposed organs of the abdomen which could be damaged. Since the heart is easily accessed for massage from under the ribs or through an incision between two ribs, OCCM is the appropriate method for resuscitation.

Although OCCM is an invasive technique involving an incision it actually causes less internal damage than CPR which can cause fractured ribs, fractured sternum, cardiac contusion, ruptured liver, ruptured spleen, and lacerations of the vena cava and other vessels. OCCM also has the advantage of allowing the surgeon to temporarily suspend blood flow to the lower half of the body in order to increase oxygenated blood flow to the brain. This technique of resuscitation also allows for visual monitoring of the heart and is useful for patients with inelastic or barrel chests or after CPR has failed.

Presently, medical students receive little training and infrequent practice in OCCM. This is mainly due to the fact that training on humans is not legally or ethically feasible and the standard practice of using canines is both expensive and ethically undesirable as it involved inducing cardiac trauma in the animal. Because of these factors practice is minimal and extra or advanced practice is unlikely.

Although numerous devices have been created to instruct and practice CPR external heart massage such as "dummies" as in:

U.S. Pat. No. 3,049,811 (Reuben, Aug. 21, 1962)
U.S. Pat. No. 3,994,075 (Kohnke, Nov. 30, 1976)
U.S. Pat. No. 4,001,950 (Blumensaadt, Jan. 11, 1977)
U.S. Pat. No. 4,611,998 (Ramamurthy, Sep. 16, 1986)

and teaching aids not housed in mannequins such as:

U.S. Pat. No. 4,092,788 (Gowing, Jun. 6, 1978)
U.S. Pat. No. 4,619,617 (Rice, Oct. 28, 1986)

No such dummies or teaching aids are currently available to aid in the teaching of, or for practicing OCCM.

SUMMARY OF THE INVENTION

Recognizing the need for a device that can be used to demonstrate and provide practice in OCCM, the proposed embodiment utilizes a lifelike thorax housing an exposed flexible heart that can be manipulated or squeezed rhythmically to displace fluid from one reservoir into another. This process simulates venous return and oxygenated arterial transmission of blood to and from the body.

In addition to learning proper squeezing rhythm, the object of this invention is to provide proper feel of the hearts composition and the flow rates and fluid pressures within.

Another objective of this invention is to provide and OCCM training device that simulates various cardiac complications such as backup, flow restriction, and sudden increases and decreases in fluid pressure.

A further objective of this invention is to provide a suitable and less expensive replacement for the live animals that are currently being used in medical and veterinary schools to train students in OCCM technique. Also, to allow students more practice in a more convenient manner and to permit variations in practice exercises.

BRIEF DESCRIPTION OF DRAWINGS

Preferred embodiment of the invention will subsequently be described utilizing the following detailed descriptions as depicted in the attached drawings in which.

Figure 1:
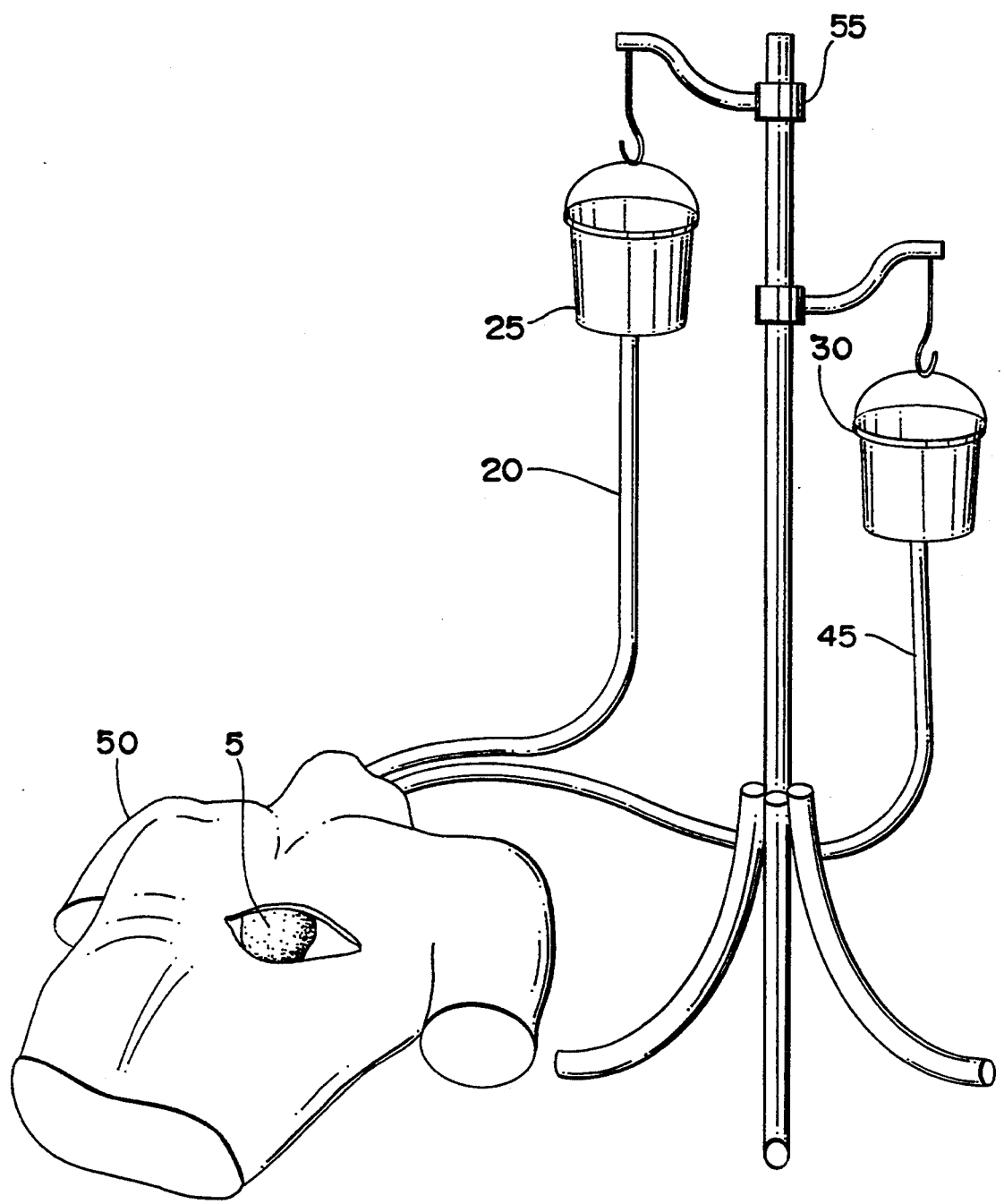
FIG. 1 is a perspective of a thoracic mannequin connected by two tubes to two calibrated cylindrical fluid reservoirs suspended by a stand.
Figure 2:
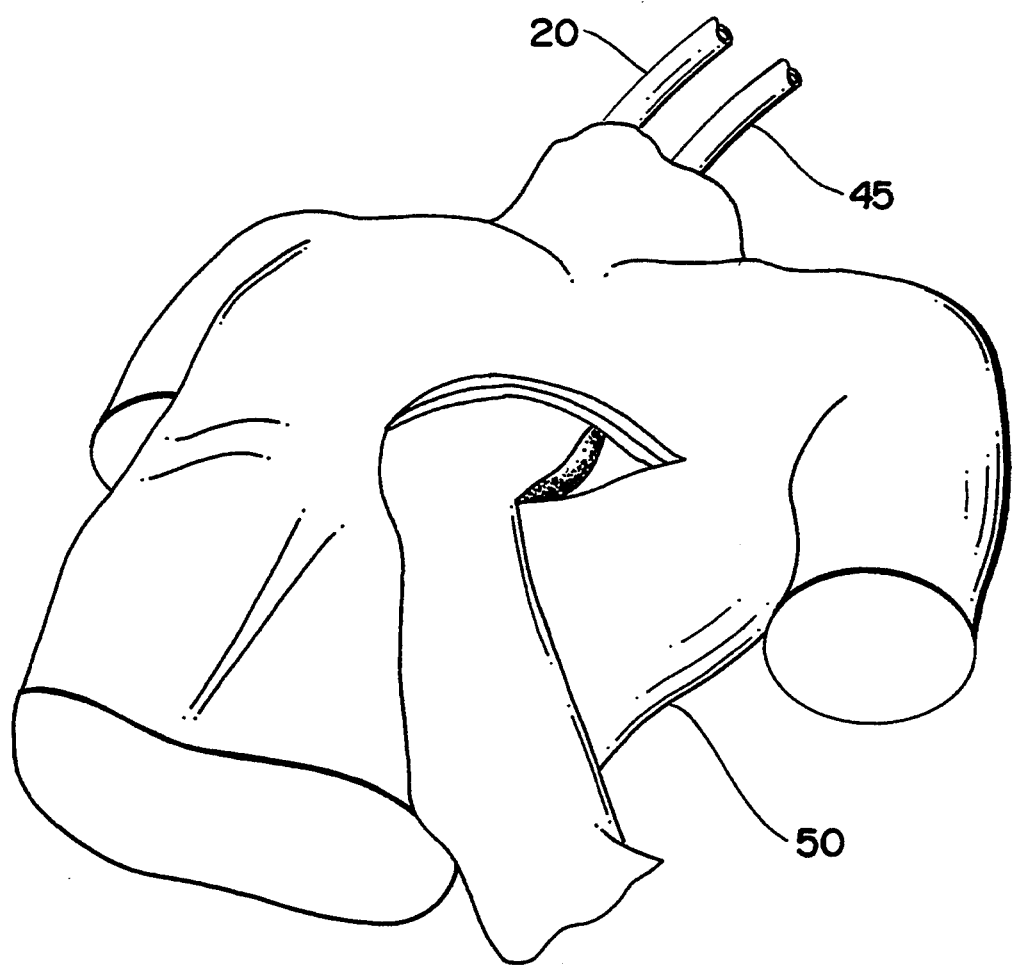
FIG. 2 is a perspective of the thorax with skin covering pulled aside to reveal heart model, with practitioner's hand grasping it, connected to two tubes.
Figure 3:
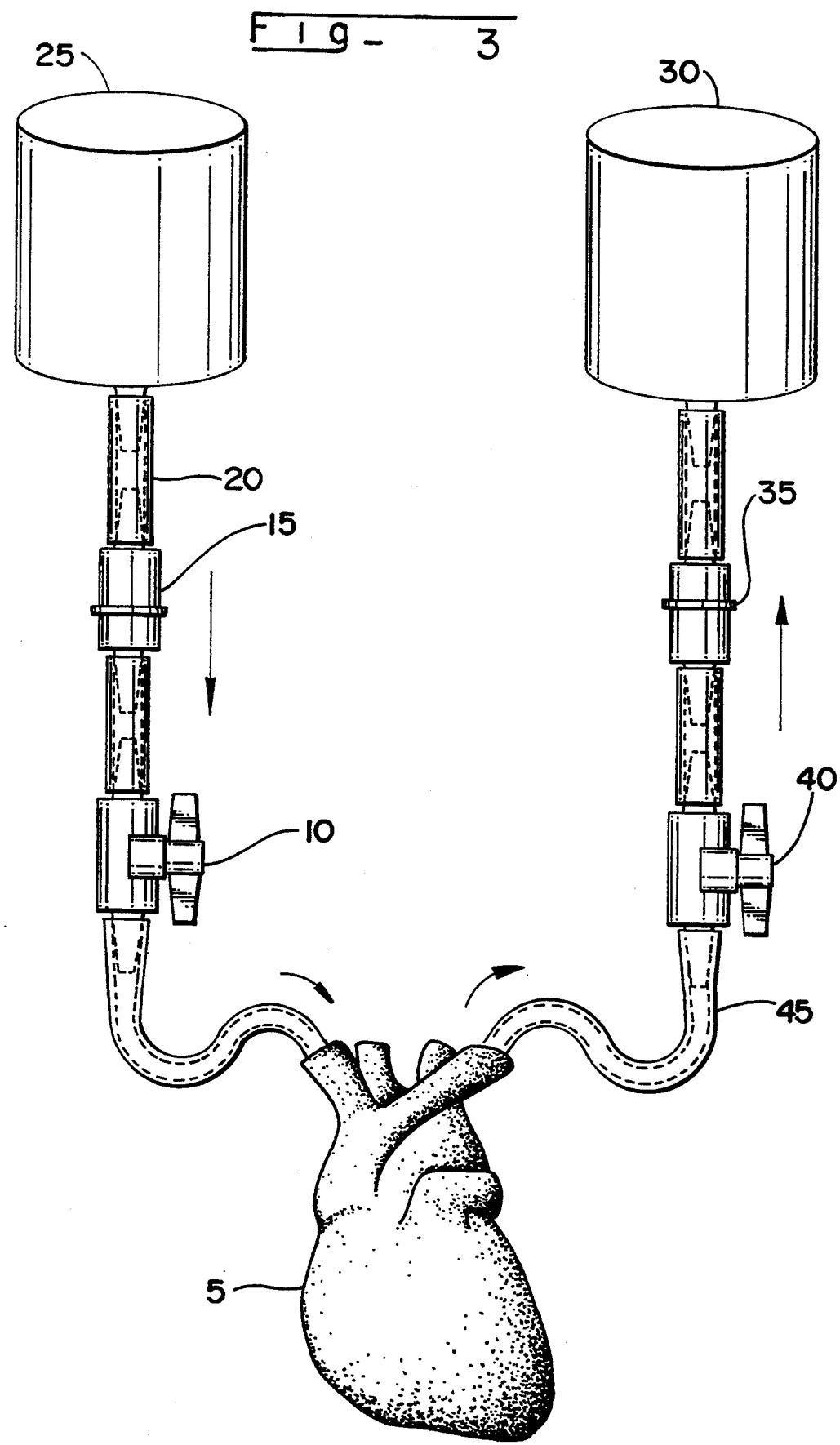
FIG. 3 is a perspective of the fluid systems comprising the hollow elastic heart model connected to the two cylindrical reservoirs by tubing fitted with regulatory and check valves.

REFERENCE NUMERALS IN DRAWINGS 5. heart model
10. regulatory valve
15. check valve
20. flexible tubing
25. output fluid reservoir
30. input fluid reservoir
35. check valve
40. regulatory valve
45. flexible tubing
50. thoracic mannequin
55. adjustable reservoir support stand

DESCRIPTION OF ILLUSTRATIVE EMBODIMENT

The illustrative embodiment comprises a thoracic mannequin 50 attached via two tubes 20, 45 to two reservoir cylinders 25, 30 and held vertically in place by adjustable stand 55. A molded hollow heart 5 of elastic material having the approximate feel of an actual animal heart when filled with fluid is set within the thorax 50 having skin material peeled back to expose heart 5 and permit manipulation of said heart 5 by the practitioner's hand. The hollow heart 5 is connected to two tubes 20, 45 each containing a check valve 15, 35 and a regulatory valve 10, 40. Check valve 15 is set opposite to check valve 35 to allow discharge only from model heart 5 to reservoir 30; check valve 15 is set opposite to check valve 35 to allow intake only from reservoir 25 into modal heart 1.

In use, the practitioner reaches into the thoracic mannequin 50 and massages or squeezes the model heart 5 in rhythmic succession which through the resultant creation of pressure differences within the inlet and outlet tubes 20, 45 each containing a check valve 15, 35 and a regulatory valve 10, 40. Check valve 15 is set opposite to check valve 35 to allow discharge only from model heart 5 to reservoir 30; check valve 15 is set opposite to check valve 35 to allow intake only from reservoir 25 into model heart 1.

In use, the practitioner reaches into the thoracic mannequin 50 and massages or squeezes the model heart 5 in rhythmic succession which through the resultant creation of pressure differences within the inlet and outlet tubes 20, 45 displaces some suitably viscous and blood-like fluid from reservoir 25 and sends it through check valve 35 and into reservoir 30. When reservoir 30 becomes filled to capacity, to can be detached from the stand 55 and poured into inlet reservoir 25. Graduations on the reservoirs can be used to calculate the rate and amount of fluid generated by simulated OCCM. The regulatory valves 10, 40 can be used to increase or decrease fluid flow to and from the heart 5 to mimic actual cardiac trauma and excessive internal bleeding. Additionally, reservoirs 25, 30 can be raised or lowered vertically on adjustable stand 55 to deliver varied fluid pressures.

Although the description above contains many specifications, this embodiment should not be a limiting factor of the invention but a preferred functionally and economically feasible model of it. For example, a multi chambered heart with variable wall thickness could lend more realism to the model. It would allow for even greater variation in practice exercises by permitting the user to suspend blood flow to specific arterial systems as a surgeon might. Instead of using calibrations on the reservoirs and a watch to approximate blood flows, a simple commercially available flowmeter could be installed to monitor heart and vessel flow rates and pressures. The reservoirs, modeling the body's blood supply could be replaced with a closed system of compressed gas digitally controlled by a computer to give precise pressure distributions.

Thus, there are many subtle variations that can at once complicate and improve the invention but are all still within the teachings and spirit of the present invention as set forth in the following claims.

What is claimed is:

1. A cardio-vascular resuscitation training simulator for open chest cardiac massage technique comprising a thoracic mannequin wherein a molded hollow heart is housed within the thoracic mannequin and is accessible via an aperture in the mannequin's side, and wherein the molded hollow head is connected to an inlet and outlet pressure system.

2. The simulator in claim 1 in which said molded hollow head is made of such a material as to approximate the tactility and elasticity of an actual animal heart and to reflect changes in pressure as supplied by said inlet and outlet pressure system.

* * * * *